United States Patent [19]

Gamble

[11] Patent Number: 4,510,912
[45] Date of Patent: Apr. 16, 1985

[54] FUEL SYSTEM

[76] Inventor: David E. Gamble, 435 S. Stewart St., Mesa, Ariz. 85202

[21] Appl. No.: 467,756

[22] Filed: Feb. 18, 1983

[51] Int. Cl.³ .............................................. F02M 31/00
[52] U.S. Cl. .................................... 123/525; 123/557; 123/1 A
[58] Field of Search ............... 123/525, 527, 557, 1 A, 123/575, 576, 578, 3

[56] References Cited

U.S. PATENT DOCUMENTS

| | | | |
|---|---|---|---|
| 1,931,698 | 10/1933 | Holzapfel | 123/525 |
| 2,067,595 | 1/1937 | Browne | 123/1 A |
| 2,150,764 | 3/1939 | Farineau | 123/525 |
| 2,285,905 | 6/1942 | Cunningham | 123/557 |
| 2,315,882 | 4/1943 | Trimble | 123/525 |
| 3,659,574 | 5/1972 | Reschke | 123/525 |
| 3,718,000 | 2/1973 | Walker | 123/525 |
| 4,335,697 | 6/1982 | McLean | 123/525 |

*Primary Examiner*—Ronald H. Lazarus
*Attorney, Agent, or Firm*—Don J. Flickinger

[57] ABSTRACT

A fuel system for use with an internal combustion engine includes primary and secondary carburetors and vaporizing apparatus. When starting the engine, liquid fuel is supplied by a fuel pump to the primary carburetor via a first switchable valve means. After the engine has warmed sufficiently, liquid fuel is prevented from reaching the primary carburetor, and instead is supplied to the vaporizing apparatus via second switchable valve means. Vaporized fuel is supplied to the primary carburetor from the vaporizing apparatus via the secondary carburetor.

4 Claims, 1 Drawing Figure

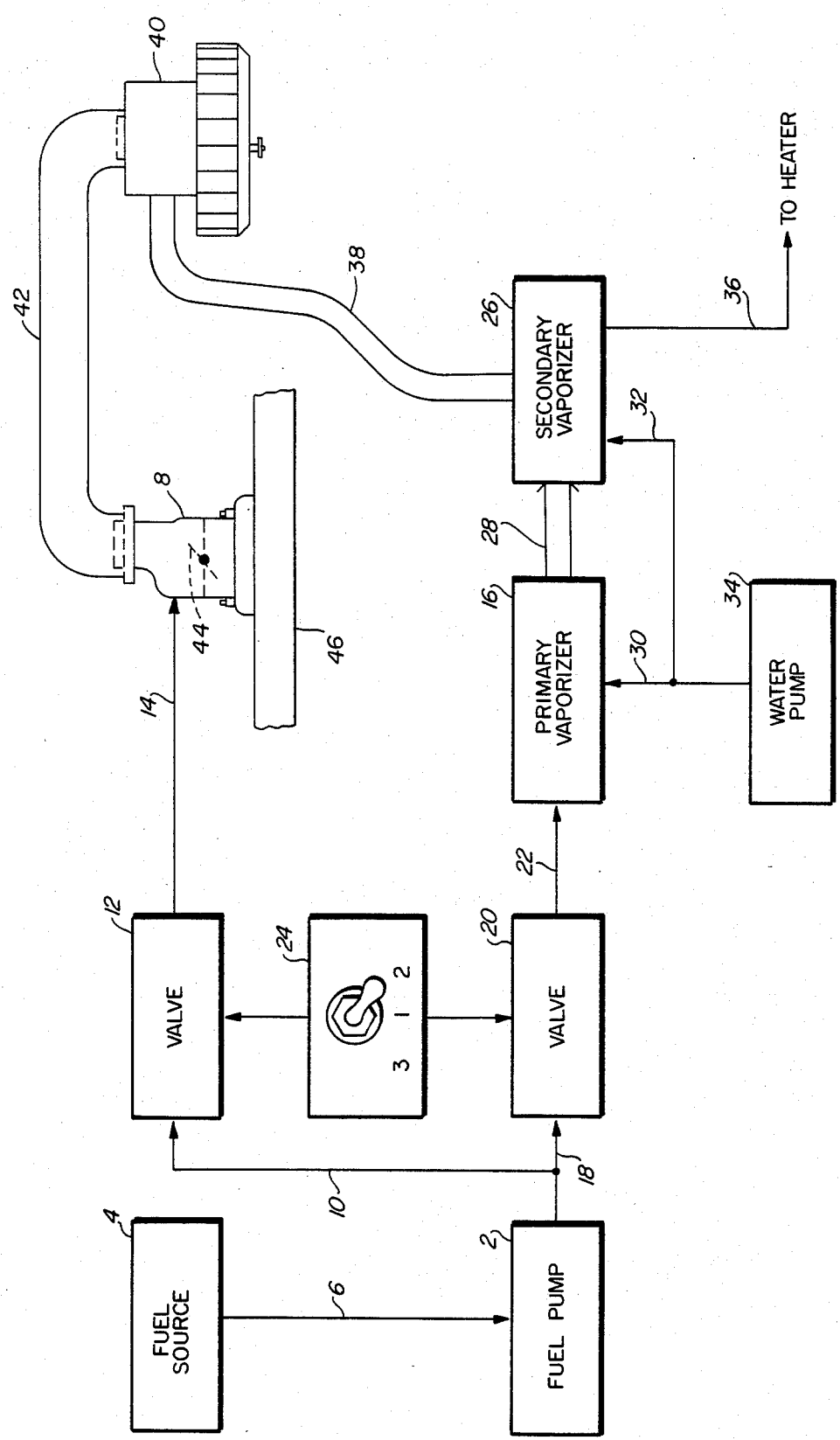

FUEL SYSTEM

BACKGROUND OF THE INVENTION

1. Field of the Invention

This invention relates generally to internal combustion engines and, more particularly, to a fuel system utilizing primary and secondary carburetors, the latter supplying the former, and a single source of fuel selectively supplying either carburetor.

2. Prior Art

As is well known, the rising costs of gasoline and the periodic shortages thereof inspired the search for alternate methods of powering vehicles. One such known alternate method is the substitution of alcohol for gasoline. Alcohol is significantly less expensive than gasoline and is readily available from a number of sources. Vehicles presently exist which are powered by alcohol.

It is also well known that fuel in a vapor or gaseous state may be more efficiently converted to energy than when in a liquid state. As a result, vehicles have been constructed which are powered by vapor or gaseous fuel. Such systems, however, have certain disadvantages. First, the availability of gaseous or vapor fuel is limited and therefore it is doubtful that such vehicles will gain wide acceptance. Second, such vehicles require an on-board high-pressure storage tank. Third, while it is true that vapor fuels are more efficient, engines utilizing such fuels are more difficult to start than liquid fuel engines since liquid fuel systems generally provide a richer air/fuel mixture for combustion.

SUMMARY OF THE INVENTION

It is a object of the present invention to provide an improved fuel system for use with an internal combustion engine.

It is a further object of the present invention to provide an improved alcohol fuel system for use in conjunction with an internal combustion engine.

It is a still further object of the present invention to provide a fuel system which supplies liquid fuel to an internal combustion engine until the engine reaches a predetermined temperature and thereafter supplies fuel in a super vaporized state.

It is yet another object of the present invention to provide a fuel system utilizing primary and secondary carburetors, the latter supplying the former, and a single source of fuel selectively supplying either carburetor.

According to a broad aspect of the invention there is provided a fuel system for use with an internal combustion engine of the type which receives fuel from a source of liquid fuel by means of a fuel pump and of the type which has associated therewith an engine cooling system including a water pump, said fuel system comprising a primary carburetor for supplying fuel to said engine, vaporizing means for vaporizing said liquid fuel to form a vapor fuel, switching means for selectively supplying liquid fuel to said primary carburetor and to said vaporizing means and for blocking the flow of liquid fuel to said primary carburetor and said vaporizing means, a secondary carburetor for receiving said vapor fuel from said vaporizing means and supplying it to said primary carburetor.

According to a further aspect of the invention there is provided a fuel system wherein said switching means comprises first valve means coupled between said fuel pump and said primary carburetor, second valve means coupled between said fuel pump and said vaporizing means, and switch means for opening only one or neither of said first and second valve means.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 1 is a block diagram of the inventive fuel system.

DESCRIPTION OF THE PREFERRED EMBODIMENT

The inventive fuel system includes a fuel pump 2 which receives liquid fuel (alcohol) from source 4 through fuel line 6. Fuel pump 2 supplies fuel either to alcohol carburetor 8 via fuel line 10, fuel valve 12 and fuel line 14 or to primary vaporizer 16 via fuel line 18, fuel valve 20 and fuel line 22. That is, when 3-position switch 24 is placed in position "2" (i.e. the liquid position), valve 12 opens, valve 20 closes, and fuel is supplied to alcohol carburetor 8. However, when switch 24 is placed in position "3" (i.e. the vapor position), valve 12 closes, valve 20 opens and fuel is supplied to primary vaporizer 16. Vaporized fuel passes from primary vaporizer 16 to secondary vaporizer 26 via vapor hose 28 where the fuel is super vaporized. Hot water is supplied to vaporizers 16 and 26, via hot water line 30 and 32 respectively, by water pump 34 which is coupled to the engine's cooling system (not shown). After the hot water has been utilized by vaporizers 16 and 26, it may be returned to the vehicle's heater via line 36. In summer, a bypass could be used to bypass the heater so as to permit circulation with the heater off.

The super vaporized fuel is conveyed via vapor hose 38 to a liquid petroleum (LP) carburetor 40. From there, the vaporized fuel is drawn into the engine via line 42 and carburetor 8.

The system operates as follows. When starting the engine, switch 24 (which may be mounted on the vehicle's dashboard and is electrically coupled to valves 12 and 20 and to the vehicle's electrical system) is placed in position "2" thereby permitting liquid alcohol to flow to carburetor 8. In this case, the vehicle will operate in the well known manner; i.e. liquid fuel will be drawn into the engine via carburetor 8 and converted into energy.

When engine temperature reaches approximately 180° F.–190° F. switch 24 is placed in position "1" which causes both valves 12 and 20 to close. When the engine is about to stall as a result of lack of fuel, switch 24 is placed in position "3" (vapor), and fuel pump 2 will pump fuel to the primary and secondary vaporizers 16 and 26 respectively. When the fuel is vaporized, it is drawn into the engine intake manifold 46, by the engine's vacuum, through hose 38, LP carburetor 40, hose 42, and into the air intake of carburetor 8. At this point, the engine is running entirely on vapor being supplied by LP carburetor 40. Alcohol carburetor 8 merely controls the engine's vacuum permitting the LP carburetor 40 to function and controls the vacuum for the distributor automatic timing advance mechanism. Both functions are controlled by the throttle plate 44 in the alcohol carburetor.

LP carburetor 40 is controlled entirely by engine vacuum. For example, when the engine is operating at a slow idle speed, the throttle plate in carburetor 8 will be nearly closed providing very little vacuum to LP carburetor 40 which in turn releases very little vapor. When the throttle plate in carburetor 8 is open, a very high vacuum is produced causing LP carburetor to release a large quantity of vapor.

When the engine is to be turned off, switch 24 should first be placed in position "1" until the engine is about to stall and then be placed in position "2" (liquid). This will cause the fuel bowl in carburetor 8 to fill to its proper level so as to permit the engine to be restarted after it has cooled. Furthermore, by operating the engine with switch 24 in position "1", all fuel provided by the system prior to the switch is burned preventing engine operation or both liquid and vapor fuel simultaneously.

The components of the inventive fuel system are well known and commercially available. For example, vaporizers 16 and 26 may be of the type bearing model number M6 and manufactured by Century Gas Equipment Company. The LP carburetor 40 may be an Imperial 300A manufactured for Century Gas Equipment Company, and valves 12 and 20 may be electrically operated solenoid fuel valves bearing model number 2341 likewise manufactured by Century Gas Equipment Company.

The above description is given by way of example only. Changes in form and details may be made by one skilled in the art without departing from the scope of the invention. For example, the system is not limited to using alcohol as a fuel. Additionally, when starting the engine in below freezing temperatures, a windshield washer arrangement containing gasoline or other fuel may be used to prime the engine. A manual choke would also be helpful.

Various changes and modifications to the embodiment herein chosen for purposes of illustration will readily occur to those skilled in the art. To the extent that such variations and modifications do not depart from the spirit of the invention, they are intended to be included within the scope thereof which is assessed only by a fair interpretation of the following claims.

Having fully described and disclosed the present invention in such clear and concise terms as to enable those skilled in the art to understand and practice the same, the invention claimed is:

1. In an internal combustion engine of the type which receives alcohol from a source by means of a fuel pump and of the type which has associated therewith an engine cooling system including a water pump, wherein the improvement comprises an improved fuel system including:
   a primary carburetor for receiving alcohol in liquid form from said fuel pump and supplying the alcohol to the engine for combustion;
   vaporizing means for vaporizing alcohol to form a vapor fuel;
   selection means for selectively supplying alcohol to said primary carburetor and to said vaporizing means and for blocking the flow of alcohol to said primary carburetor and to said vaporizing means, said selection means including:
   a first electrically operated solenoid valve coupled between said fuel pump and said primary carburetor;
   a second electrically operated solenoid valve coupled between said fuel pump and said vaporizing means;
   switch means for opening only one or neither of said first and second valves; and
   a secondary carburetor for receiving vaporized alcohol from said vaporizing means and supplying it to the air intake upstream of said primary carburetor wherein said switch means comprises a three position switch having a first position for opening only said first electrically operated solenoid valve, a second position for opening only said second electrically operated solenoid valve, and a third position for maintaining said first and second electrically operated solenoid valves closed.

2. A fuel system according to claim 1 wherein said vaporizing means comprises:
   a primary vaporizer for receiving alcohol from said second electrically operated solenoid valve; and
   a secondary vaporizer coupled in series between said primary vaporizer and said secondary carburetor for receiving alcohol vapor from said primary vaporizer and supplying super vaporized alcohol to said secondary carburetor.

3. A fuel system according to claim 2 wherein said primary and secondary vaporizers receive hot water from said engine cooling system via said water pump.

4. A fuel system according to claim 2 wherein said secondary carburetor is a liquid petroleum carburetor.

* * * * *